(12) United States Patent
Soga et al.

(10) Patent No.: US 10,840,518 B2
(45) Date of Patent: Nov. 17, 2020

(54) PHOTOCURABLE RESIN COMPOSITION, FUEL CELL, AND SEALING METHOD

(71) Applicant: THREEBOND CO., LTD., Hachioji (JP)

(72) Inventors: Tetsunori Soga, Hachioji (JP); Mao Anai, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 254 days.

(21) Appl. No.: 15/748,486

(22) PCT Filed: Aug. 1, 2016

(86) PCT No.: PCT/JP2016/072550
§ 371 (c)(1),
(2) Date: Jan. 29, 2018

(87) PCT Pub. No.: WO2017/018547
PCT Pub. Date: Feb. 2, 2017

(65) Prior Publication Data
US 2018/0226664 A1    Aug. 9, 2018

(30) Foreign Application Priority Data

Jul. 30, 2015  (JP) ................................. 2015-150588

(51) Int. Cl.
| C08F 2/46 | (2006.01) |
|---|---|
| C08F 2/50 | (2006.01) |
| C08G 61/04 | (2006.01) |
| H01M 8/0284 | (2016.01) |
| C08F 290/04 | (2006.01) |
| C08F 10/10 | (2006.01) |
| C08F 8/00 | (2006.01) |
| C09J 5/00 | (2006.01) |
| C08G 81/02 | (2006.01) |
| C09K 3/10 | (2006.01) |
| H01M 8/0273 | (2016.01) |
| H01M 8/0286 | (2016.01) |
| H01M 8/1018 | (2016.01) |

(52) U.S. Cl.
CPC ............ H01M 8/0284 (2013.01); C08F 2/50 (2013.01); C08F 8/00 (2013.01); C08F 10/10 (2013.01); C08F 290/042 (2013.01); C08G 81/024 (2013.01); C09J 5/00 (2013.01); C09K 3/1018 (2013.01); H01M 8/0273 (2013.01); H01M 8/0286 (2013.01); H01M 8/1018 (2013.01); C08F 2810/30 (2013.01); C08F 2810/40 (2013.01); C09J 2203/33 (2013.01); C09J 2451/00 (2013.01); H01M 2008/1095 (2013.01)

(58) Field of Classification Search
CPC ............ H01M 8/0284; H01M 8/0273; H01M 8/0286; H01M 8/1018; H01M 2008/1095; C09K 3/018; C08G 81/024; C08F 8/00; C08F 220/1818; C08F 220/302; C08F 220/1811; C08F 110/10; C08F 4/16; C08F 10/10; C08F 290/042; C08F 2/50; C08F 2810/30; C08F 2810/40
USPC .................... 522/7, 6, 189, 184, 1; 520/1
See application file for complete search history.

(56) References Cited

U.S. PATENT DOCUMENTS

| 5,171,760 | A | 12/1992 | Kaszas et al. |
|---|---|---|---|
| 9,512,247 | B2 | 12/2016 | Ikari et al. |
| 2004/0023042 | A1* | 2/2004 | Suzuki ................... C08J 7/0427 428/447 |
| 2005/0043480 | A1 | 2/2005 | Osawa |
| 2006/0052546 | A1 | 3/2006 | Morikawa et al. |
| 2006/0078781 | A1 | 4/2006 | Stegink et al. |
| 2008/0289755 | A1 | 11/2008 | Burdzy et al. |
| 2009/0000732 | A1 | 1/2009 | Jacobine et al. |
| 2009/0004541 | A1 | 1/2009 | Jacobine et al. |
| 2009/0004551 | A1 | 1/2009 | Burdzy et al. |
| 2009/0162715 | A1 | 6/2009 | Burdzy |
| 2009/0176953 | A1 | 7/2009 | Morikawa et al. |
| 2009/0263669 | A1 | 10/2009 | Burdzy et al. |
| 2010/0155247 | A1 | 6/2010 | Cao et al. |
| 2013/0303649 | A1* | 11/2013 | Ichiryu ................... C08F 2/48 522/75 |
| 2014/0190736 | A1 | 7/2014 | Cao et al. |
| 2014/0243444 | A1* | 8/2014 | Ikari ..................... C08F 8/00 522/28 |
| 2016/0083487 | A1 | 3/2016 | Burdzy et al. |

(Continued)

FOREIGN PATENT DOCUMENTS

| EP | 1548867 A1 | 6/2005 |
|---|---|---|
| EP | 2762506 A1 | 8/2014 |

(Continued)

OTHER PUBLICATIONS

Europe Patent Office, "Search Report for European Patent Application No. 16830649.6," dated Mar. 1, 2019.

(Continued)

*Primary Examiner* — Jessica Whiteley
(74) *Attorney, Agent, or Firm* — Manabu Kanesaka

(57) ABSTRACT

The present invention has an object to provide a photocurable resin composition which can be quickly cured by irradiation with active energy rays such as ultraviolet rays and achieves excellent adhesion to an electrolyte membrane having properties difficult to bond. Specifically, provided is a photocurable resin composition containing the following (A) to (C) ingredients: (A) ingredient: a polymer having a polyisobutylene backbone containing a —[$CH_2C(CH_3)_2$]— unit, the polymer having one or more (meth)acryloyl groups; (B) ingredient: a photo-radical polymerization initiator; and (C) ingredient: one or more compounds selected from the group consisting of silicone oligomers each having one or more alkoxy groups and one or more (meth)acryloyl groups, silicone oligomers each having one or more alkoxy groups and one or more amino groups, and silane compounds each having one or more isocyanate groups.

15 Claims, 1 Drawing Sheet

(56) References Cited

U.S. PATENT DOCUMENTS

2018/0241056 A1    8/2018   Soga et al.
2020/0148798 A1    5/2020   Burdzy et al.

FOREIGN PATENT DOCUMENTS

| | | |
|---|---|---|
| EP | 3340352 A1 | 6/2018 |
| JP | H02-088614 A | 3/1990 |
| JP | 10-237116 A | 9/1998 |
| JP | 2004-075824 A | 3/2004 |
| JP | 2004-111146 A | 4/2004 |
| JP | 2007-100099 A | 4/2007 |
| JP | 2008516395 A | 5/2008 |
| JP | 2009-524194 A | 6/2009 |
| JP | 2009-531516 A | 9/2009 |
| JP | 2011-124258 A | 6/2011 |
| JP | 2013-095861 A | 5/2013 |
| JP | 2013-148785 A | 8/2013 |
| JP | 2013-216782 A | 10/2013 |
| JP | 2014-225456 A | 12/2014 |
| JP | 2015-021103 A | 2/2015 |
| WO | 2014/183021 A1 | 11/2014 |
| WO | 2018/003855 A1 | 1/2018 |

OTHER PUBLICATIONS

PCT/ISA/210, "International Search Report for International Application No. PCT/JP2016/072550," dated Nov. 1, 2016.
Japan Patent Office, "Office Action for Japanese Patent Application No. 2017-531425," dated Aug. 20, 2020.

\* cited by examiner a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in gas barrier properties, heat resistance, acid resistance, and flexibility while having low moisture permeability. The thermosetting resin compositions in Patent Literatures 1 to 4, however, require a heating process for curing, and therefore have problems in that a long process time is required and there is a concern over deterioration of the electrolyte membrane due to the heating.

In this regard, attention is being paid to photocurable resin compositions that can shorten the process and prevent deterioration of the electrolyte membrane due to heat. Patent Literatures 5 and 6 disclose photocurable sealants each containing a polyisobutylene diacrylate, a (meth)acrylic monomer, and a photoinitiator.

PHOTOCURABLE RESIN COMPOSITION, FUEL CELL, AND SEALING METHOD

RELATED APPLICATIONS

The present application is National Phase of International Application No. PCT/JP2016/072550 filed Aug. 1, 2016, and claims priority from Japanese Application No. 2015-150588, filed Jul. 30, 2015, the disclosure of which is hereby incorporated by reference herein in its entirety.

TECHNICAL FIELD

The present invention relates to a photocurable resin composition which can be quickly cured by irradiation with active energy rays such as ultraviolet rays and achieves excellent adhesion to an electrolyte membrane having properties difficult to bond.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and forms only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operation temperature is relatively low temperature (around 80° C.), and therefore is expected for usages such as motive power sources for automobiles, power generators for households, small power sources for electronic equipment such as mobile phones, and power sources for emergency.

As illustrated in FIG. 1, a cell 1 of a solid polymer fuel cell has a structure including: an electrolyte membrane electrode conjugant 5 (MEA) structured such that a polymer electrolyte membrane 4 is nipped between an air electrode 3a and a fuel electrode 3b; a frame 6 that supports the MEA; and separators 2 by which gas flow paths are formed.

In order to activate the solid polymer fuel cell, it is necessary to supply a fuel gas containing hydrogen to an anode electrode and supply an oxidation gas containing oxygen to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene polymer and causes a hydrosilylation reaction (see Patent Literature 1); a thermosetting resin composition which uses a fluoropolyether compound and causes a hydrosilylation reaction (see Patent Literature 2); a thermosetting resin composition which uses

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258
Patent Literature 5: Published Japanese Translation of PCT International Application No. 2009-531516
Patent Literature 6: Japanese Patent Application Publication No. H02-88614

SUMMARY OF INVENTION

Technical Problems

Nevertheless, the photocurable resin compositions disclosed in Patent Literatures 5 and 6 contain a polyisobutylene diacrylate as a main ingredient for the purpose of achieving sealability, but are insufficient in photocurablity. Moreover, the photocurable resin compositions disclosed in Patent Literatures 5 and 6 contain the polyisobutylene diacrylate with low polarity as the main ingredient for the purpose of achieving the sealability, but have a problem of being poor in the adhesiveness to various kinds of members due to its structure. Furthermore, the polymer electrolyte membrane of the fuel cell is made of a fluoropolymer that is a material extremely difficult to bond by using the conventional sealing agent. Accordingly, the photocurable resin compositions of Patent Literatures 5 and 6 have even more difficulty in bonding the electrolyte membrane.

Under these circumstances, there has been a demand for a photocurable resin composition that achieves both quick curing by irradiation with active energy rays such as ultraviolet rays and adhesion to an electrolyte membrane having properties difficult to bond.

Solution to Problems

The present invention has been made in view of the foregoing circumstances, and has an object to provide a photocurable resin composition which can be quickly cured by irradiation with active energy rays such as ultraviolet rays and achieves excellent adhesion to an electrolyte membrane having properties difficult to bond.

The present invention is a photocurable resin composition containing the following (A) to (C) ingredients:

(A) ingredient: a polymer having a polyisobutylene backbone containing a —[CH$_2$C(CH$_3$)$_2$]— unit, the polymer having one or more (meth)acryloyl groups;

(B) ingredient: a photopolymerization initiator; and (C) ingredient: one or more compounds selected from the group consisting of silicone oligomers each having one or more alkoxy groups and one or more (meth)acryloyl groups, silicone oligomers each having one or more alkoxy groups and one or more amino groups, and silane compounds (silane coupling agents) each having one or more isocyanate groups.

Moreover, other modes of the present invention may be as follows.

[1]

A photocurable resin composition containing the following (A) to (C) ingredients:

(A) ingredient: a polymer having a polyisobutylene backbone containing a —[CH$_2$C(CH$_3$)$_2$]— unit, the polymer having one or more (meth)acryloyl groups (B) ingredient: a photo-radical polymerization initiator; and (C) ingredient: one or more compounds selected from the group consisting of silicone oligomers each having one or more alkoxy groups and one or more (meth)acryloyl groups, silicone oligomers each having one or more alkoxy groups and one or more amino groups, and silane compounds each having one or more isocyanate groups.

[2]

The photocurable resin composition according to the [1], further containing a (meth)acrylate monomer as (D) ingredient.

[3]

The photocurable resin composition according to the [2], wherein the (D) ingredient is a (meth)acrylate monomer containing an alkyl group having 5 to 30 carbon atoms or an alicyclic group having 5 to 30 carbon atoms.

[4]

The photocurable resin composition according to any one of the [1] to [3], wherein a content of the (C) ingredient is 0.1 to 30 parts by mass relative to 100 parts by mass of the (A) ingredient.

[5]

The photocurable resin composition according to any one of the [1] to [4], wherein the (A) ingredient is a polymer having a polyisobutylene backbone and represented by a general formula (1):

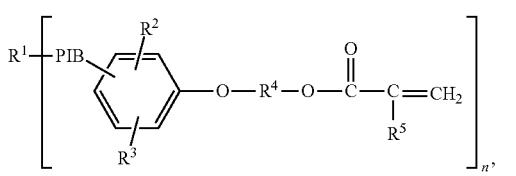

wherein R$^1$ represents a monovalent or polyvalent aromatic hydrocarbon group or a monovalent or polyvalent aliphatic hydrocarbon group, PIB represents the polyisobutylene backbone containing the —[CH$_2$C(CH$_3$)$_2$]— unit, R$^4$ represents a divalent hydrocarbon group having 2 to 6 carbon atoms and optionally containing an oxygen atom, R$^2$ and R$^3$ each independently represent a hydrogen atom or a monovalent hydrocarbon group having 1 to 20 carbon atoms, R$^5$ represents a hydrogen atom, a methyl group, an ethyl group, or a propyl group, and n is any integer of 1 to 6.

[6]

The photocurable resin composition according to any one of the [1] to [5], wherein the (C) ingredient is at least one of the silicone oligomers each having one or more alkoxy groups and one or more (meth)acryloyl groups and the silicone oligomers each having one or more alkoxy groups and one or more amino groups, and a dynamic viscosity at 25° C. of the least one silicone oligomer is less than 45 mm$^2$/s.

[7]

A photocurable sealing agent for a fuel cell containing the photocurable resin composition according to any one of the [1] to [6].

[8]

The sealing agent according to the [7], wherein the photocurable sealing agent for a fuel cell is a photocurable sealing agent for a fuel cell to be applied to a periphery of any member selected from the group consisting of a separator, a frame, an electrolyte, a fuel electrode, an air electrode, and an electrolyte membrane electrode conjugant which are members constituting the fuel cell.

[9]

The sealing agent according to the [7], wherein the photocurable sealing agent for a fuel cell is a sealing agent between adjacent separators in a fuel cell, a sealing agent between a separator and a frame in the fuel cell, or a sealing agent between a frame and an electrolyte membrane or an electrolyte membrane electrode conjugant in the fuel cell.

[10]

The sealing agent according to any one of the [7] to [9], wherein the fuel cell is a solid polymer fuel cell.

[11]

A cured product obtained by photocuring the photocurable resin composition according to any one of the [1] to [6].

[12]

A fuel cell comprising any seal selected from the group consisting of a seal between adjacent separators in the fuel cell, a seal between a separator and a frame in the fuel cell, and a seal between a frame and an electrolyte membrane or an electrolyte membrane electrode conjugant in the fuel cell, wherein any one of the seals contains the cured product according to the [11].

[13]

The fuel cell according to the [12], wherein the fuel cell is a solid polymer fuel cell.

[14]

A method for sealing at least part of between at least two flanges of seal target components including the at least two flanges, at least one of which is a light-transmissive flange that allows active energy rays to pass therethrough, the method comprising the steps of:

applying the photocurable resin composition according to any one of the [1] to [6] to a surface of at least one of the flanges;

sticking the one flange with the photocurable resin composition applied thereto onto the other flange with the photocurable resin composition interposed in between; and sealing the at least part of between the at least two flanges by curing the photocurable resin composition by irradiation with active energy rays through the light-transmissive flange.

[15]

A method for sealing at least part of between at least two flanges of seal target components including the at least two flanges, comprising the steps of:

applying the photocurable resin composition according to any one of the [1] to [6] to at least one of the flanges;

irradiating the applied photocurable resin composition with active energy rays to cure the photocurable resin composition, thereby forming a gasket composed of a cured product of the photocurable resin composition; and placing the other flange on the gasket, and sealing the at least part of between the at least two flanges in such a way that the other flange and the one flange with the photocurable resin composition applied thereto are pressure bonded together with the gasket interposed in between.

[16]

A method for sealing at least part of between at least two flanges of seal target components including the at least two flanges, comprising the steps of:

placing a gasket formation mold on at least one of the flanges;

injecting the photocurable resin composition according to any one of the [1] to [6] into at least part of a cavity formed between the gasket formation mold and the flange on which the mold is placed;

irradiating the photocurable resin composition with the active energy rays to cure the photocurable resin composition, thereby forming a gasket composed of a cured product of the photocurable resin composition;

detaching the mold from the one flange; and sealing the at least part of between the at least two flanges by placing the other flange on the gasket and then pressure bonding the one and the other flanges together with the gasket interposed in between.

The present invention has been made in view of the foregoing circumstances, and provides a photocurable resin composition which can be quickly cured by irradiation with active energy rays such as ultraviolet rays and achieves excellent adhesion to an electrolyte membrane having properties difficult to bond.

DESCRIPTION OF EMBODIMENTS

Figure 1:
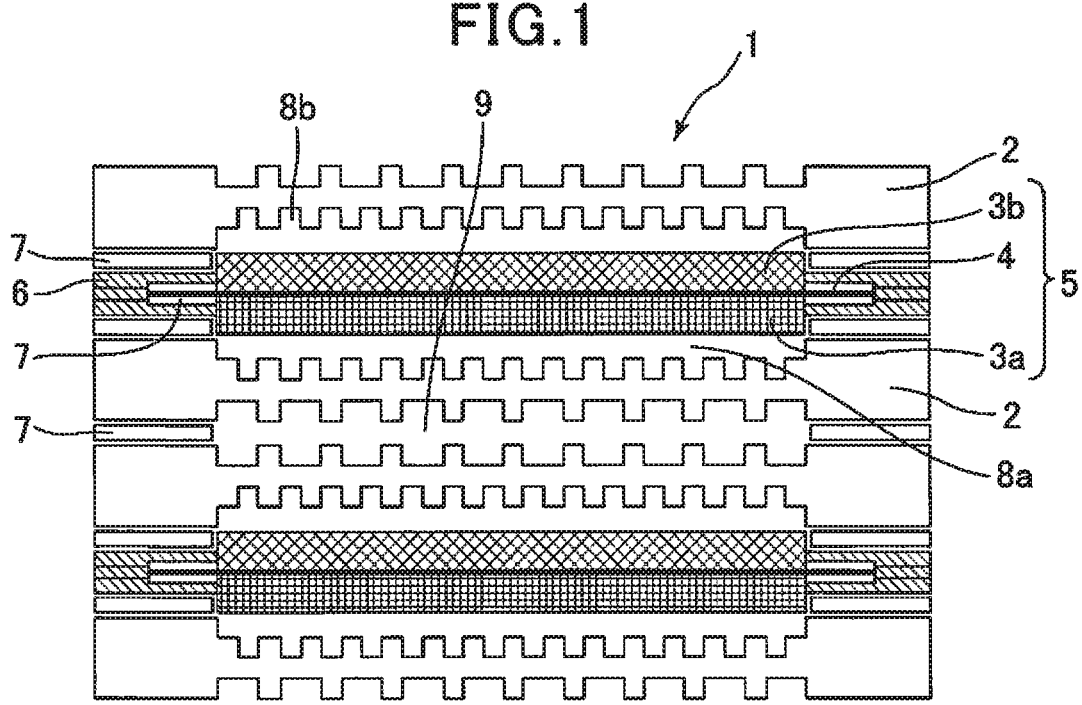
FIG. 1 is a schematic cross sectional view of a single cell of a fuel cell system.

Hereinafter, the present invention will be described in details.

<(A) Ingredient>

An (A) ingredient used in the present invention is any polymer, not particularly limited, having a polyisobutylene backbone containing a —[CH$_2$C(CH$_3$)$_2$]— unit, the polymer having one or more (meth)acryloyl groups. The (A) ingredient only has to contain the —[CH$_2$C(CH$_3$)$_2$]— unit (polyisobutylene backbone), for example, and may be a polymer which contains a "constituent unit other than the —[CH$_2$C(CH$_3$)$_2$]— unit." A suitable content of —[CH$_2$C(CH$_3$)$_2$]— units in the (A) ingredient is, for example, 70% by mass or more, preferably 75% by mass or more, and more preferably 80% by mass or more relative to the total mass of the constituent units in the (A) ingredient. Moreover, the suitable content of —[CH$_2$C(CH$_3$)$_2$]— units in the (A) ingredient is, for example, 100% by mass or less, 95% by mass or less in another mode, and 90% by mass or less in still another mode. It is suitable that the (A) ingredient contains preferably 1 to 6 (meth)acryloyl groups, more preferably 2 to 4 (meth)acryloyl groups, further preferably 2 to 3 (meth)

acryloyl groups, and particularly preferably 2 (meth)acryloyl groups. It should be noted that the polymer of the present invention is not theoretically restricted but is defined as, for example, a compound having a structure in which the main chain of the polymer contains repeating units of a monomer, the compound containing 100 or more of the repeating units.

As the (A) ingredient, a polymer having a polyisobutylene backbone represented by the general formula (1) is preferable from the viewpoint that such polymer is excellent in the photocurability and the adhesion to an electrolyte membrane. A specific example of the (A) ingredient is a polyisobutylene polymer containing a (meth)acryloyloxyalkoxyphenyl group. Note that the main backbone of the (A) ingredient of the present invention is a polyisobutylene backbone. As for monomers constituting this polyisobutylene backbone, it is possible to mainly use isobutylene and additionally use another monomer(s) and to copolymerize them as long as the effects of the present invention are not impaired. Here, the (A) ingredient is preferably liquid at normal temperature (25° C.) because the workability is good.

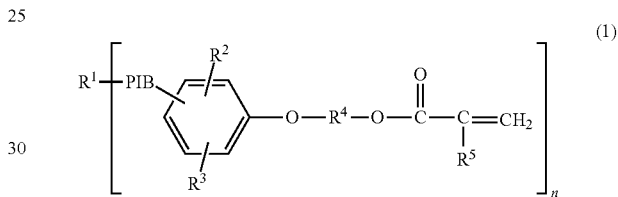

In the formula (1), $R^1$ represents a monovalent or polyvalent aromatic hydrocarbon group or a monovalent or polyvalent aliphatic hydrocarbon group, and is preferably a polyvalent aromatic hydrocarbon group, and particularly preferably a phenylene group. PIB represents a polyisobutylene backbone containing the —[CH$_2$C(CH$_3$)$_2$]— unit (or consisting of the —[CH$_2$C(CH$_3$)$_2$]— unit). $R^4$ represents a divalent hydrocarbon group having 2 to 6 carbon atoms and optionally containing an oxygen atom, and is preferably a hydrocarbon group having 2 or 3 carbon atoms. $R^2$ and $R^3$ each independently represent a hydrogen atom or a monovalent hydrocarbon group having 1 to 20 carbon atoms, and is preferably a hydrogen atom. $R^5$ represents a hydrogen atom, a methyl group, or an ethyl group, and is preferably a hydrogen atom or a methyl group. Then, n is any integer of 1 to 6, and is particularly preferably an integer of 2 to 4.

The molecular weight of the (A) ingredient of the present invention is not particularly limited. From the viewpoints of flowability, physical properties after curing and the like, the number average molecular weight by chromatography measurement is, for example, preferably 500 to 500,000, more preferably 1,000 to 100,000, and particularly preferably from 3,000 to 50,000. Here, the number average molecular weight was calculated by a calculation method in terms of standard polystyrene using size-exclusion chromatography (SEC).

The viscosity at 25° C. of the (A) ingredient of the present invention is not particularly limited, but is preferably 5 to 3000 Pa·s, more preferably 50 to 2500 Pa·s, and particularly preferably 100 to 2000 Pa·s from the viewpoint of workability and the like. The viscosity is, for example, 5 Pa·s or more, preferably 50 Pa·s or more, and more preferably 100 Pa·s or more, and is, for example, 3000 Pa·s or less, preferably 2500 Pa·s or less, and more preferably 2000 Pa·s or less. A particularly preferable viscosity is 1550 Pa·s. Unless otherwise specified, the viscosity at 25° C. was measured using a cone-plate type viscometer.

A method for producing the (A) ingredient is not particularly limited, and any publicly known method may be used. For example, there is an obtaining method including reacting a hydroxyl-terminated polyisobutylene polymer with an acryloyl chloride or methacryloyl chloride, which are disclosed by T. P. Liao and J. P. Kennedy, Polymer Bulletin, Vol. 6, pp. 135 to 141 (1981), and Puskas et al., Polymer Bulletin, Vol. 20, pp. 253 to 260 (1988).

As other methods for producing the (A) ingredient, there are: an obtaining method including reacting a hydroxyl-terminated polyisobutylene polymer with a compound having a (meth)acryloyl group and an isocyanate group; an obtaining method including reacting a hydroxyl-terminated polyisobutylene polymer with a compound containing an isocyanate group and a compound containing a (meth)acryloyl group and a hydroxyl group; an obtaining method including reacting a hydroxyl-terminated polyisobutylene polymer with an (meth)acrylic acid or a lower ester of (meth)acrylic acid by a dehydration esterification method or an ester exchange method; and the like.

Then, a method for producing the polyisobutylene polymer represented by the general formula (1) is not particularly limited, but is preferably an obtaining method including reacting a halogen-terminated polyisobutylene polymer disclosed in Japanese Patent Application Publication No. 2013-216782 with a compound represented by the general formula (2) and containing a (meth)acryloyl group and a phenoxy group. Moreover, the halogen-terminated polyisobutylene polymer can be obtained by any publicly known method, and is obtained, for example, by cationic polymerization, and more preferably by living cationic polymerization.

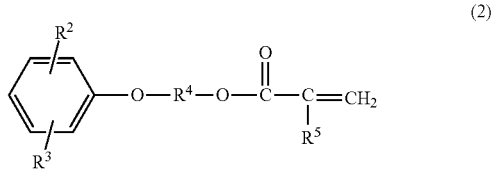

(2)

In the formula (2), $R^2$, $R^3$, $R^4$ and $R^5$ may be those as defined above for the formula (1). Specifically, $R^4$ represents a divalent hydrocarbon group having 2 to 6 carbon atoms and optionally containing an oxygen atom. $R^2$ and $R^3$ each independently represent a hydrogen atom or a monovalent hydrocarbon group having 1 to 20 carbon atoms. $R^5$ represents a hydrogen atom, a methyl group, or an ethyl group. As the compound represented by the above formula (2), there are, for example, phenoxymethyl acrylate, phenoxyethyl acrylate, phenoxypropyl acrylate, and the like, and a preferable one is phenoxyethyl acrylate.

<(B) Ingredient>

A photo-radical polymerization initiator used as the (B) ingredient in the present invention may be any compound not particularly limited, as long as the compound, when irradiated with active energy rays, generates radicals or the like to cure the (A) ingredient of the present invention. Here, the active energy rays mean all types of rays in a broad sense, which include radioactive rays such as α ray and β ray, electromagnetic waves such as γ ray and X ray, electron beam (EB), ultraviolet rays of about 100 to 400 nm, visible rays of about 400 to 800 nm, and the like, and the ultraviolet rays are preferable. Examples of the (B) ingredient include an acetophenone-based photo-radical polymerization initiator, a benzoin-based photo-radical polymerization initiator, a benzophenone-based photo-radical polymerization initiator, a thioxanthone-based photo-radical polymerization initiator, an acylphosphine oxide-based photo-radical polymerization initiator, a titanocene-based photo-radical polymerization initiator, and the like. Among them, the acetophenone-based photo-radical polymerization initiator, the benzophenone-based photo-radical polymerization initiator, and the acylphosphine oxide-based photo-radical polymerization initiator are preferable from the viewpoint that a cured product excellent in curability can be obtained by irradiation with active energy rays. Any one of the initiators may be used alone, or two or more of them may be used in combination.

The acetophenone-based photo-radical polymerization initiator is not particularly limited, and examples thereof include, but are not particularly limited to, diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl] propanone oligomer, and the like. Commercially available products of the acetophenone-based photo-radical polymerization initiators include IRGACURE 184, IRGACUR 1173, IRGACURE 2959, and IRGACURE 127 (manufactured by BASF SE), and ESACURE KIP-150 (manufactured by Lamberti s.p.a.).

An example of the benzophenone-based photo-radical polymerization initiator is benzophenone.

The acylphosphine oxide-based photo-radical polymerization initiator is not particularly limited, and examples thereof include, but are not particularly limited to, bis(2,4,6-trimethylbenzoyl)-phenyl-phosphine oxide, 2,4,6-trimethylbenzoyl-diphenyl-phosphine oxide, and the like. Commercially available products of the acylphosphine oxide-based photo-radical polymerization initiator include IRGACURE TPO, IRGACURE 819, and IRGACURE 819DW (manufactured by BASF SE).

The content of the (B) ingredient of the present invention is not particularly limited, but is preferably 0.1 to 30 parts by mass, further preferably 0.5 to 20 parts by mass, and particularly preferably 1 to 15 parts by mass relative to 100 parts by mass of the (A) ingredient from the viewpoint of photocurablity.

<(C) Ingredient>

The (C) ingredient of the present invention is not particularly limited, as long as the (C) ingredient is at least one compound selected from the group consisting of silicone oligomers each having one or more alkoxy groups and one or more (meth)acryloyl groups, silicone oligomers each having one or more alkoxy groups and one or more amino groups, and silane compounds (silane coupling agents) each having one or more isocyanate groups. The (C) ingredient of the present invention is one which can be used as a tackifier in a photocuring reaction, and when combined with the other ingredients of the present invention, can achieve adhesion improvement to impart adhesiveness also to a difficult-to-bond material.

The silicone oligomer having one or more alkoxy groups and one or more (meth)acryloyl groups is preferably a silicone oligomer at least having an alkoxy group and a(meth)acryloyl group in side chains. The silicone oligomer having one or more alkoxy groups and one or more amino groups is preferably a silicone oligomer at least having an alkoxy group and an amino group in side chains. The (C) ingredient of the present invention is preferably liquid at 25° C. because the adhesion to an electrolyte membrane and the application workability are excellent. The alkoxy group in the (C) ingredient is not particularly limited, and examples thereof include a methoxy group, an ethoxy group, and the like.

The silane compounds having one or more isocyanate groups are not particularly limited, and examples thereof include 3-isocyanatopropyltriethoxysilane, 3-isocyanatopropylmethyldiethoxysilane, isocyanatopropyltrimethoxysilane, and the like.

Then, a dynamic viscosity at 25° C. of the silicone oligomer having one or more alkoxy groups and one or more (meth)acryloyl groups or the silicone oligomer having one or more alkoxy groups and one or more amino groups is not particularly limited, but is preferably less than 45 $mm^2/s$ and particularly preferably 40 $mm^2/s$ or less from the viewpoints of easy permeation into an electrolyte membrane which is a porous material and excellent adhesion. In addition, the dynamic viscosity at 25° C. is preferably 10 $mm^2/s$ or more and particularly preferably 20 $mm^2/s$ or more. Meanwhile, an amount of alkoxy group in the silicone oligomer having one or more alkoxy groups and one or more (meth)acryloyl groups or the silicone oligomer having one or more alkoxy groups and one or more amino groups is not particularly limited, but is preferably 18% by weight or more but less than 50% by weight, and particularly preferably 19% by weight or more but less than 35% by weight from the viewpoint that the adhesion to an electrolyte membrane is excellent. Here, the silicone oligomer of the present invention is not particularly limited, and an example thereof is a compound having an average molecular weight in a range of 500 to 5000 and having a structure of dimethylsiloxane, methylphenylsiloxane, diphenylsiloxane, or the like. Moreover, the silicone oligomer is obtained by a condensation reaction of an alkoxy group-containing silane compound having an alkoxy group in a non-limiting example.

Commercially available products of the silicone oligomer having one or more alkoxy groups and one or more (meth) acryloyl groups in side chains include KR-513 and X-40-2672B (manufactured by Shin-Etsu Chemical Co., Ltd.), and the like. Commercially available products of the silicone oligomer having one or more alkoxy groups and one or more amino groups in side chains include X-40-2651 (manufactured by Shin-Etsu Chemical Co., Ltd.) and the like. Commercially available products of the silane compound having one or more isocyanate groups include KBM-9007, KBE-9007, and KBE-9207 (manufactured by Shin-Etsu Chemical Co., Ltd.), A-1310 and Y-5187 (manufactured by Momentive Performance Materials Inc. (Japan)), and the like.

The content of the (C) ingredient of the present invention is not particularly limited, but is preferably 0.1 to 30 parts by mass, more preferably 0.5 to 20 parts by mass, and particularly preferably 1 to 10 parts by mass relative to 100 parts by mass of the (A) ingredient. When the (C) ingredient is contained in the aforementioned range, the adhesion to an electrolyte membrane is excellent.

<(D) Ingredient>

A (meth)acrylate monomer as the (D) ingredient of the present invention is a compound which can be polymerized by radical species generated by the (B) ingredient of the present invention. However, the ingredient (A) of the present invention is excluded. As the ingredient (D), it is possible to use, for example, any of monofunctional monomers, bifunctional monomers, trifunctional monomers, and polyfunctional monomers, and the like. Among them, a (meth) acrylate monomer having an alkyl group having 5 to 30 carbon atoms or an alicyclic group having 5 to 30 carbon atoms is preferable because the (meth)acrylate monomer is miscible with the ingredient (A) and is excellent in photocurability. Here, the number of carbon atoms is, for example, 2 or more, preferably 3 or more, more preferably 5 or more, and further preferably 7 or more, and is, for example, 30 or less, preferably 20 or less, more preferably 15 or less, and further preferably 10 or less.

The (meth)acrylate monomer having an alkyl group having 5 to 30 carbon atoms is not particularly limited, and examples thereof include 2-ethylhexyl(meth)acrylate, octyl (meth)acrylate, isooctyl(meth)acrylate, decyl(meth)acrylate, dodecyl(meth)acrylate, isodecyl(meth)acrylate, lauryl (meth)acrylate, n-octadecyl(meth)acrylate, isooctadecyl (meth)acrylate, nonadecane(meth)acrylate, 3-heptyldecyl-1-(meth)acrylate, stearyl(meth)acrylate, and the like. Then, the (meth)acrylate monomer having an alicyclic group having 5 to 30 carbon atoms is not particularly limited, and examples thereof include cyclohexyl(meth)acrylate, dicyclopentanyl (meth)acrylate, dicyclopentenyl(meth)acrylate, dicyclopentenyloxy(meth)acrylate, isobornyl(meth)acrylate, adamantyl (meth)acrylate, dicyclopentenyl di(meth)acrylate and the like. As the (D) ingredient, any one of them or a mixture of any two or more of them can be used.

The content of the (D) ingredient is not particularly limited, but is preferably 3 to 300 parts by mass, more preferably 5 to 200 parts by mass, and particularly preferably 10 to 100 parts by mass relative to 100 parts by mass of the (A) ingredient. In this case, it is preferable that the (D) ingredient be contained in 3 parts by mass or more because there is no concern to decrease surface curability, and be contained in 300 parts by mass or less because the moisture permeability of the photocurable resin composition does not deteriorate.

<Optional Ingredient>

The composition of the present invention may use, as long as the object of the present invention is not impaired, additives such as oligomers having a (meth)acryloyl group (excluding the (A) ingredient of the present invention), thermal radical initiators, polythiol compounds, tertiary amine compounds, various elastomers such as styrene-based copolymers, bulking agents, storage stabilizers, antioxidants, light stabilizers, plasticizers, pigments, flame retardants, tackifiers, and surfactants.

The oligomers having a (meth)acryloyl group (excluding the (A) ingredient of the present invention) are not particularly limited, and examples thereof include urethane(meth) acrylate having a polybutadiene backbone, urethane(meth) acrylate having a hydrogenated polybutadiene backbone, urethane(meth)acrylate having a polycarbonate backbone, urethane(meth)acrylate having a polyether backbone, urethane(meth)acrylate having a polyester backbone, urethane (meth)acrylate having a castor oil backbone, isoprene-based (meth)acrylate, hydrogenated isoprene-based (meth)acrylate, epoxy(meth)acrylate, (meth)acryl group-containing acrylic polymer, and the like. Among them, urethane(meth) acrylate having a polybutadiene backbone, urethane(meth) acrylate having a hydrogenated polybutadiene backbone, urethane (meth)acrylate having a castor oil backbone, isoprene-based (meth)acrylate, and hydrogenated isoprene-based (meth)acrylate are preferable because they are excellent in miscibility with the (A) ingredient and the (D) ingredient of the present invention.

The thermal radical initiators are not particularly limited, and examples thereof include ketone peroxide, peroxyketal, dialkyl peroxide, hydroperoxide, peroxyester, diacyl peroxide, peroxydicarbonate, and the like. Any one of these compounds may be used alone, or a mixture of two or more of them may be used.

The polythiol compounds are not particularly limited, and examples thereof include trimethylolpropane tris(3-mercaptopropionate), pentaerythritol tetrakis(3-mercaptopropionate), trimethylolpropane tris(3-mercaptobutyrate), trimethylolethane tris(3-mercaptobutyrate), trimethylolethane tris(3-mercaptobutyrate), ethyleneglycol bis(3-mercaptoglycolate), butanediol bis(3-mercaptoglycolate), trimethylolpropane tris(3-mercaptoglycolate), pentaerythritol tetrakis (3-mercaptoglycolate), tris-[(3-mercaptopropionyloxy)-ethyl]-isocyanurate, pentaerythritol tetrakis(3-mercaptopropionate), tetraethyleneglycol bis(3-mercaptopropionate), dipentaerythritol hexakis(3-mercaptopropionate), pentaerythritol tetrakis(3-mercaptobutyrate), 1,4-bis(3-mercaptobutyryloxy)butane, 1,3,5-tris (3-mercaptobutyloxyethyl)-1,3,5-triazine-2,4,6 (1H,3H,5H)-trione, and the like. Any one of these compounds may be used alone, or a mixture of two or more of them may be used.

Examples of commercially available products of the polythiol compounds include, but not particularly limited to: TMTP and PETP (manufactured by YODO KAGAKU CO., LTD.); TEMPIC, TMMP, PEMP, PEMP-II-20P, and DPMP (manufactured by SC ORGANIC CHEMICAL CO., LTD.); MTNR1, MTBD1, and MTPE1 (manufactured by SHOWA DENKO K.K.); and the like. Any one of these compounds may be used alone, or a mixture of two or more of them may be used.

In the present invention, a tertiary amine compound may be blended for the purpose of improving the photocurability. The tertiary amine compound is not particularly limited, and examples thereof include trimethylamine, triethylamine, tributylamine, N,N'-diethanolamine, N,N'-dimethyl-p-toluidine, N,N'-dimethyl-aniline, N-methyl-diethanolamine, N-methyl-dimethanolamine, N,N'-dimethylamino-acetophenone, N,N'-dimethylamino-benzophenone, N,N'-diethylamino-benzophenone, triisopropanolamine, and the like.

In the present invention, a styrene-based copolymer may be blended for the purpose of adjusting the rubber physical properties of a cured product. The styrene-based copolymer is not particularly limited, and examples thereof include styrene-isoprene copolymer (SIP), styrene-butadiene copolymer (SB), styrene-ethylene-butylene-styrene copolymer (SEBS), styrene-isobutylene-styrene copolymer (SIBS), acrylonitrile-styrene copolymer (AS), styrene-butadiene-acrylonitrile copolymer (ABS), and the like.

In the present invention, for the purpose of improving the elastic modulus of a cured product, the flowability and the like, a bulking agent may be added as long as the storage stability is not impaired. Specific bulking agents include organic powders, inorganic powders, metallic powders, and the like. Examples of the inorganic powder bulking agents include glass, fumed silica, alumina, mica, ceramics, silicone rubber powder, calcium carbonate, aluminum nitride, carbon powder, kaolin clay, dried clay mineral, dried diatomite, and the like. The content of the inorganic powder is preferably about 0.1 to 100 parts by mass relative to 100 parts by mass of the (A) ingredient. The content of 0.1 parts by mass or more is preferable because sufficient effects can be expected, whereas the content of 100 parts by mass or less is also preferable because the photocurable resin composition can obtain sufficient flowability and have a certain level of workability.

The fumed silica can be blended for the purpose of adjusting the viscosity of the photocurable resin composition or improving the mechanical strength of a cured product. A preferably usable fumed silica is one obtained by hydrophobic treatment with an organochlorosilane, a polyorganosiloxane, a hexamethyldisilazane, or the like. Specific examples of the fumed silica include commercially available products manufactured by NIPPON AEROSIL CO., LTD. under the trade names of AEROSIL R974, R972, R972V, R972CF, R805, R812, R812S, R816, R8200, RY200, RX200, RY200S, R202, and the like.

Examples of the organic powder bulking agents include polyethylene, polypropylene, nylon, crosslinked acryl, crosslinked polystyrene, polyester, polyvinyl alcohol, polyvinyl butyral, and polycarbonate. The content of the organic powder is preferably about 0.1 to 100 parts by mass relative to 100 parts by mass of the (A) ingredient. The content of 0.1 parts by mass or more is preferable because sufficient effects can be expected, whereas the content of 100 parts by mass or less is also preferable because the photocurable resin composition can obtain sufficient flowability and have a certain level of workability.

Examples of the metallic powder bulking agents include gold, platinum, silver, copper, indium, palladium, nickel, alumina, tin, iron, aluminum, stainless steel, and the like. The content of the metallic powder is preferably about 0.1 to 100 parts by mass and more preferably 1 to 50 parts by mass relative to 100 parts by mass of the (A) ingredient.

In the present invention, a storage stabilizer may be added. As the storage stabilizer, it is possible to use radical absorbers such as benzoquinone, hydroquinone, and hydroquinone monomethyl ether; metal chelating agents such as ethylenediaminetetraacetic acid or 2-sodium salt thereof, oxalic acid, acetylacetone, and o-aminophenol; and the like.

In the present invention, an antioxidant may be added. Examples of the antioxidant include: quinone compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butylcatechol, 2-butyl-4-hydroxyanisole, 2,6-di-tert-butyl-p-cresol, 2-tert-butyl-6-(3-tert-butyl-2-hydroxy-5-methylbenzyl)-4-me thylphenyl acrylate, 2-[1-(2-hydroxy-3,5-di-tert-pentylphenyl)ethyl]-4, 6-di-tert-pentylphenyl acrylate, 4,4'-butylidene-bis(6-tert-butyl-3-methylphenol), 4,4'-thio-bis(6-tert-butyl-3-methylphenol), 3,9-bis[2-[3-(3-tert-butyl-4-hydroxy-5-methylphenyl)propion yloxy]-1,1-dimethylethyl]-2,4,8,10-tetraoxaspiro[5,5]undeca ne, pentaerythritol tetrakis[3-(3,5-di-tert-butyl-4-hydroxyphenyl)propionate], thiodiethylene-bis[3-(3,5-di-tert-butyl-4-hydroxyphenyl)pro pionate], octadecyl-3-(3,5-di-tert-butyl-4-hydroxyphenyl) propionate, N,N'-hexane-1,6-diylbis[3-(3,5-di-tert-butyl-4-hydroxypheny 1)propionamide], benzene propanoic acid, 3,5-bis(1,1-dimethylethyl)-4-hydroxy, $C_7$-$C_9$ alkyl ester, 2,4-dimethyl-6-(1-methylpentadecyl)phenol, diethyl[[3,5-bis (1,1-dimethylethyl)-4-hydroxyphenyl]methyl]phosphonate, 3,3',3",5,5',5"-hexa-tert-butyl-a,a',a"-(mesitylene-2,4,6-t olyl)tri-p-cresol, calcium diethyl bis[[3,5-bis(1,1-dimethyl-ethyl)-4-hydroxyphenyl]methyl]phos phonate, 4,6-bis(octylthiomethyl)-o-cresol, ethylene bis(oxyethylene) bis[3-(5-tert-butyl-4-hydroxy-m-tolyl)propionate], hexamethylene bis[3-(3,5-di-tert-butyl-4-hydroxyphenyl)propionate], 1,3, 5-tris(3,5-di-tert-butyl-4-hydroxybenzyl)-1,3,5-triazin e-2, 4,6(1H,3H,5H)-trione, 1,3,5-tris[(4-tert-butyl-3-hydroxy-2, 6-xylyl)methyl]-1,3,5-triazine-2,4,6(1H,3H,5H)-trione, a reaction product of N-phenylbenzenamine and 2,4,6-trimethylpentene, 2,6-di-tert-butyl-4-(4,6-bis(octylthio)-1,3,5-triazin-2-yla mino)phenol, picric acid, and citric acid; phosphorus compounds such as tris(2,4-di-tert-butylphenyl) phosphite, tris[2-[[2,4,8,10-tetra-tert-butyldibenzo[d,f][1,3,2]dioxap hosphepin-6-yl]oxy]ethyl]amine, bis(2,4-di-tert-butylphenyl) pentaerythritol diphosphite, bis[2,4-bis(1,1-dimethylethyl)-6-methylphenyl]ethyl ester phosphorous acid, tetrakis(2,4-di-tert-butylphenyl)[1,1-bisphenyl]-4,4'-diyl bisphosphonite, and 6-[3-(3-tert-butyl-4-hydroxy-5-methylphenyl)propoxy]-2,4,8, 10-tetra-tert-butyldibenz[d,f][1,3,2]dioxaphosphepin; sulfur-based compounds such as dilauryl 3,3'-thiodipropionate, dimyristyl 3,3'-thiodipropionate, distearyl 3,3'-thiodipropionate, pentaerythrityl tetrakis(3-lauryl thiopropionate), and 2-mercaptobenzimidazole; amine-based compounds such as phenothiazine; lactone-based compounds; vitamin E-based compounds; and the like. Among them, a phenol-based compound is preferable.

In the present invention, alight stabilizer may be added. Examples of the light stabilizer include: hindered amine-based compounds such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]eth yl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl)[[3,5-bis(1,1-dimet hylethyl)-4-hydroxyphenyl]methyl]butyl malonate, decane diacid bis(2,2,6,6-tetramethyl-1(octyloxy)-4-piperidinyl)ester, a reaction product of 1,1-dimethylethyl hydroperoxide with octane, N,N',N'',N'''-tetrakis-(4,6-bis-(butyl-(N-methyl-2,2,6,6-tetr amethylpiperidine-4-yl)amino)-triazine-2-yl)-4,7-diazadecan e-1,10-diamine, a polycondensate of dibutylamine.1,3,5-triazine-N,N'-bis(2,2,6,6-tetramethyl-4-piperidyl-1,6-hexamethylenediamine with N-(2,2,6,6-tetramethyl-4-piperidyl)butylamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate with an ethanol of 4-hydroxy-2,2,6,6-tetramethyl-1-piperidine, 2,2,4,4-tetramethyl-20-(β-lauryloxycarbonyl)ethyl-7-oxa-3,2 0-diazadispiro[5,1,11,2]heneicosan-21-one, β-alanine N-(2,2,6,6-tetramethyl-4-piperidinyl)-dodecyl ester/tetradecyl ester, N-acetyl-3-dodecyl-1-(2,2,6,6-tetramethyl-4-piperidinyl)pyr rolidine-2,5-dione, 2,2,4,4-tetramethyl-7-oxa-3,20-diazadispiro[5,1,11,2]heneic osan-21-one, 2,2,4,4-tetramethyl-21-oxa-3,20-diazabicyclo-[5,1,11,2]-hen eicosan-20-propanoic acid-dodecyl ester/tetradecyl ester, propanedioic acid, [(4-methoxyphenyl)-methylene]-bis(1,2,2,6,6-pentamethy 1-4-piperidinyl)ester, a higher fatty acid ester of 2,2,6,6-tetramethyl-4-piperidinol, and 1,3-benzenedicarboxyamide,N,N'-bis(2,2,6,6-tetramethyl-4-pi peridinyl); benzophenone-based compounds such as octabenzone; benzotriazole-based compounds such as 2-(2H-benzotriazole-2-yl)-4-(1,1,3,3-tetramethylbutyl)pheno 1, 2-(2-hydroxy-5-methylphenyl)benzotriazole, 2-[2-hydroxy-3-(3,4,5,6-tetrahydrophthalimide-methyl)-5-met hylphenyl] benzotriazole, 2-(3-tert-butyl-2-hydroxy-5-methylphenyl)-5-chlorobenzotria zole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)p ropionate with polyethylene glycol, and 2-(2H-benzotriazole-2-yl)-6-dodecyl-4-methylphenol; benzoate-based compounds such as 2,4-di-tert-butylphenyl-3,5-di-tert-butyl-4-hydroxybenzoate; triazine-based compounds such as 2-(4,6-diphenyl-1,3,5-triazine-2-yl)-5-[(hexyl)oxy]phenol; and the like. A hindered amine-based compound is particularly preferable.

In the present invention, a tackifier may be added. As the tackifier, there are 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyltrimethoxysilane, vinyltrimethoxysilane, vinyltrichlorosilane, vinyltriethoxysilane, vinyl-tris(β-methoxyethoxy)silane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate ester, methacryloxyoxyethyl acid phosphate, a half salt of methacryloxyoxyethyl acid phosphate monoethylamine, and 2-hydroxyethyl methacrylic acid phosphate; and the like. Among them, a hydroxyethyl methacrylate phosphate ester, methacryloxyoxyethyl acid phosphate, a half salt of methacryloxyoxyethyl acid phosphate monoethylamine, a 2-hydroxyethyl methacrylic acid phosphate, or the like is preferable. The content of the tackifier is preferably 0.05 to 30 parts by mass and more preferably 0.2 to 10 parts by mass relative to 100 parts by mass of the (C) ingredient.

The photocurable resin composition of the present invention can be produced by a publicly known conventional method. For example, the production can be carried out by preparing a mixture of predetermined amounts of the (A) to (C) ingredients and an additional optional ingredient(s), and mixing the mixture by using mixing means such as a mixer preferably at temperature of 10 to 70° C., more preferably at 20 to 50° C., and particularly preferably at normal temperature (25° C.) for preferably 0.1 to 5 hours, more preferably 30 minutes to 3 hours, and particularly preferably about 60 minutes.

<Application Method>

As a method for applying the photocurable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating.

<Curing Method>

A light source for curing the photocurable resin composition of the present invention by irradiation with light of active energy rays as described above, for example, ultraviolet rays, visible rays, and the like is not particularly limited, and examples thereof include a low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. As for an irradiation dose of light irradiation, a total dose is preferably 10 kJ/m$^2$ or more and more preferably 15 kJ/m$^2$ or more from the viewpoint of the properties of a cured product.

<Cured Product>

A cured product of the present invention can be obtained by curing the photocurable resin composition of the present invention in the foregoing curing method by irradiation with active energy rays such as ultraviolet rays. A cured product of the present invention may be any product obtained by curing the photocurable resin composition of the present invention regardless of a curing method employed.

<Usage and Sealing Agent>

Preferable usages of the photocurable resin composition of the present invention or the cured product thereof are photocurable sealing agents. In the present invention, the sealing agents are for usages as adhesives, coating agents, casting agents, potting agents, and the like. In order to use the photocurable resin composition for such usage, it is preferable that the photocurable resin composition of the present invention be liquid at 25° C.

Since the photocurable resin composition of the present invention or the cured product thereof is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the photocurable resin composition of the present invention can be quickly cured by irradiation with active energy rays such as ultraviolet rays, and is excellent in the adhesion to an electrolyte membrane having properties difficult to bond.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as automotive power source, household power generator, small power source for electronic equipment such as a mobile phone, and emergency power supply.

Figure 2:
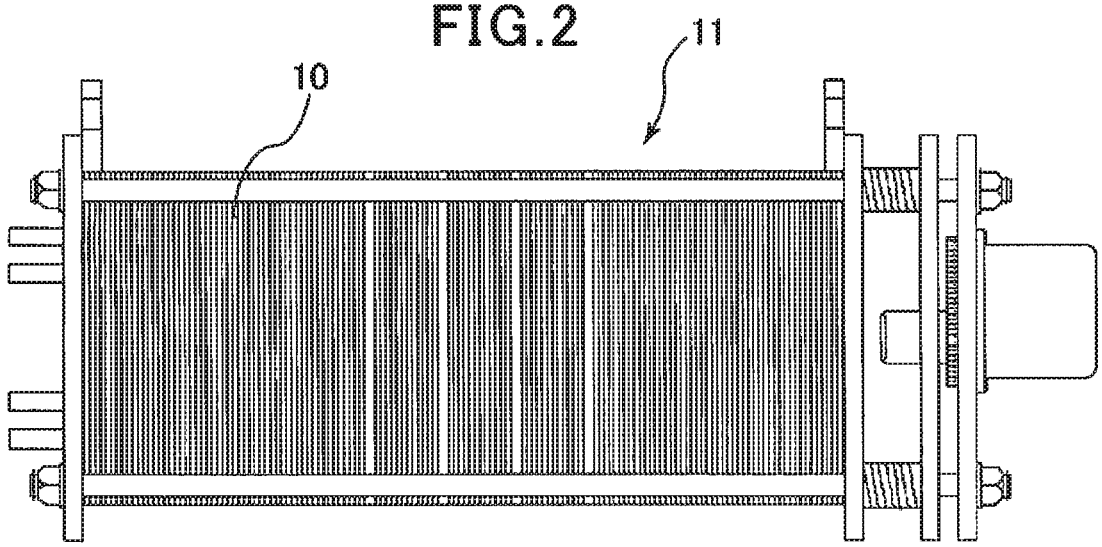
FIG. 2 is a schematic view illustrating an entire fuel cell system.

As illustrated in FIG. 1, the cell 1 of the typical solid polymer fuel cell has the structure including: the electrolyte membrane electrode conjugant 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a cooling water flow path 9. Note that a package including several hundreds of such cells stacked one on another is referred to a cell stack 10 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2+1/2O_2 \rightarrow H_2O$) occurs as a whole. To be more specific, protons ($H^+$) generated at the fuel electrode are diffused inside the solid polymer membrane to move to the oxygen electrode side, and water ($H_2O$) generated by reaction with the oxygen is discharged from the oxygen electrode side.

Fuel electrode (anode electrode): $H_2 \rightarrow 2H^+ + 2e^-$

Oxygen electrode (cathode electrode): $1/2O_2 + 2H^+ + 2e^- \rightarrow H_2O$

In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluoropolymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the photocurable resin composition of the present invention makes it possible to bond the polymer electrolyte membrane.

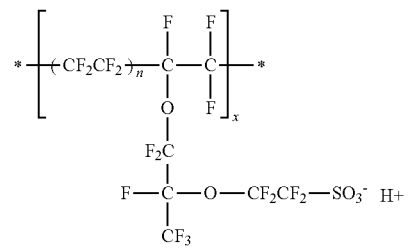

Nafion (registered trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. Examples of a material for the frame include thermoplastic resins such as polyvinyl chloride, polyethylene naphthalate, polyethylene terephthalate, polypropylene, and polycarbonate. In addition, in order to bond members using the photocurable resin composition of the present invention or a cured product thereof, it is preferable that the members be light-transmissive.

The fuel cell of the present invention is characterized in that sealing is provided by the photocurable resin composition of the present invention or the cured product thereof. The members needed to be sealed in the fuel cell are the separators, the frame, the electrolyte, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path. Since a strongly acidic atmosphere is formed by the acid generated from the electrolyte membrane, the sealing agent is required to have acid resistance.

<Sealing Method>

A sealing method using the photocurable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the photocurable resin composition of the present invention to a flange of a seal target component by an automatic coater or the like; and curing the photocurable resin composition, with the flange stuck on another flange, by irradiation with active energy rays such as ultraviolet rays from the light-transmissive flange side. More specifically, this is a method for sealing at least part of between at least two flanges of seal target components including the at least two flanges, at least one of which is a light-transmissive flange that allows active energy rays to pass therethrough, the method characterized by including the steps of: applying the foregoing photocurable resin composition to a surface of at least one of the flanges; sticking the one flange with the photocurable resin composition applied thereto onto the other flange with the photocurable resin composition interposed in between; and sealing the at least part of between the at least two flanges by curing the photocurable resin composition by irradiation with active energy rays through the light-transmissive flange.

CIPG is a method involving: applying the photocurable resin composition of the present invention in the form of a bead to a flange of a seal target component by an automatic coater or the like; forming a gasket by curing the photocurable resin composition by irradiation with active energy rays such as ultraviolet rays; and performing compression sealing with the flange stuck on another flange. More specifically, this is a method for sealing at least part of between at least two flanges of seal target components including the at least two flanges, the method characterized by including the steps of: applying the foregoing photocurable resin composition to a surface of at least one of the flanges; irradiating the applied photocurable resin composition with active energy rays to cure the photocurable resin composition, thereby forming a gasket composed of a cured product of the photocurable resin composition; placing the other flange on the gasket, and sealing the at least part of between the at least two flanges in such a way that the other flange and the one flange with the photocurable resin composition applied thereto are pressure bonded together with the gasket interposed in between.

MIPG is a method involving: placing a mold in pressure contact with a flange of a seal target component in advance; forming a gasket by injecting the photocurable resin composition into a cavity formed between the mold made of a light-transmissive material and the flange, and photocuring the photocurable resin composition by irradiation with the active energy rays such as ultraviolet rays; and performing compression sealing with the flange stuck on the other flange. Here, the mold is preferably made of a light-transmissive material, which is specifically glass, polymethylmethacrylate (PMMA), polycarbonate, cycloolefinpolymer, olefin, or the like. In addition, for easy demolding of the gasket from the mold after the formation of the gasket, it is preferable to apply a release agent such as a fluorine-based agent or a silicone-based agent. More specifically, this is a method for sealing at least part of between at least two flanges of seal target components including the at least two flanges, the method characterized by including the steps of: placing a gasket formation mold on at least one of the flanges; injecting the foregoing photocurable resin composition into at least part of a cavity formed between the gasket formation mold and the flange on which the mold is placed; irradiating the photocurable resin composition with the active energy rays to cure the photocurable resin composition, thereby forming a gasket composed of a cured product of the photocurable resin composition; detaching the mold from the one flange; and placing the other flange on the gasket and sealing the at least part of between the at least two flanges by pressure bonding the one flange and the other flange together with the gasket interposed in between.

The liquid injection molding is a method involving: forming a gasket by injecting the photocurable resin composition of the present invention with a predetermined pressure into a mold made of a light-transmissive material, and photocuring the photocurable resin composition by irradiation with active energy rays such as ultraviolet rays; and performing compression sealing with the flange stuck on the other flange. Here, the mold is preferably made of a light-transmissive material, which is specifically glass, PMMA, polycarbonate, cycloolefinpolymer, olefin, or the like. In addition, for easy demolding of the gasket from the mold after the formation of the gasket, it is preferable to apply a release agent such as a fluorine-based agent, a silicone-based agent, or the like.

EXAMPLES

Hereinafter, the present invention will be described in details by taking Examples, but the present invention should not be limited to these Examples.

Test methods used in Examples and Comparative Examples are those described later.

<Preparation of Photocurable Resin Compositions>

Example 1

The ingredients in Example 1 were put in parts by mass presented in Table 1, and stirred at normal temperature (25° C.) for 60 minutes with a stirrer (instrument name: TORNADO of high output type PM-202 (manufactured by As One Co., Ltd.), rotation speed: 100 rpm) to prepare a photocurable resin composition. The photocurable resin composition was then measured in terms of various physical properties as described later. Here, the specific amounts put in the preparation were values according to Table 1, and all the numeral values are expressed in parts by mass.

Examples 2 to 9 and Comparative Examples 1 to 8

Photocurable resin compositions in Examples 2 to 9 and Comparative Examples 1 to 8 were prepared in the same manners as in Example 1 by using the ingredients put in parts by mass presented in Tables 1 and 2, and then were measured in the physical properties. Here, the specific amounts put in the preparation were values according to Tables 1 and 2, and all the numeral values are expressed in parts by mass.

<(A) Ingredient>
<Production of a1> Production of Polyisobutylene Polymer (a1) having Acryloyloxyethoxyphenyl Group After the inside of a 5 L separable flask was replaced with nitrogen, 200 mL of n-hexane and 2000 mL of butyl chloride were added, and then were cooled to −70° C. while being stirred under a nitrogen atmosphere. Subsequently, 840 mL (9 mol) of isobutylene, 12 g (0.05 mol) of p-dicumyl chloride and 1.1 g (0.012 mol) of 2-methylpyridine were added. After the reaction mixture was cooled to −70° C., 5.0 mL (0.05 mol) of titanium tetrachloride was added to initiate polymerization. Three hours after the initiation of polymerization, 40 g of phenoxyethyl acrylate (LIGHT ACRYLATE PO-A, manufactured by kyoeisha Chemical Co., Ltd.) and 110 ml of titanium tetrachloride were added. After that, stirring was continued at −70° C. for 4 hours, and then 1000 ml of methanol was added to stop the reaction.

The supernatant was fractionated from the reaction solution, and the solvent and so on were distilled off. After that, the product was dissolved in 3000 ml of n-hexane, was washed with 3000 ml of pure water three times, and was reprecipitated from the methanol. Thereafter, the solvent was distilled off under reduced pressure. The obtained polymer was vacuum-dried at 80° C. for 24 hours to obtain a polyisobutylene polymer (a1) having an acryloyloxyethoxyphenyl group.

The polymer a1 contains —[$CH_2C(CH_3)_2$]— unit, and has two acryloyl groups. More specifically, a1 is a polyisobutylene polymer of the general formula (1) in which $R^1$ represents a phenylene group, PIB represents a polyisobutylene backbone, $R^4$ represents a hydrocarbon group having 2 carbon atoms, $R^2$ and $R^3$ each independently represent a hydrogen atom, $R^5$ represents a hydrogen atom, and n is 2.

Here, the average molecular weight of the ingredient a1 (by a chromatographic method, in terms of polystyrene) was 11,100, and the viscosity (25° C.) of the ingredient a1 was 1550 Pa·s.

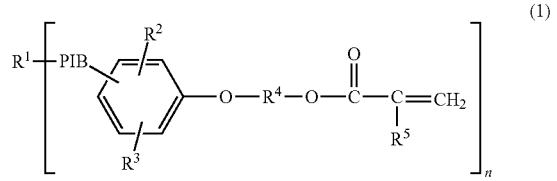

(1)

<(B) Ingredient>
b1: benzophenone (reagent)
b2: 2-hydroxy-2-methyl-1-phenyl-propan-1-one (IRGACURE 1173, manufactured by BASF SE)
<(C) Ingredient>
c1: silicone oligomer having an alkoxy group content of 20% by weight and a dynamic viscosity at 25° C. of 35 $mm^2$/s, and containing an acryloyl group and a methoxy group in side chains (KR-513, manufactured by Shin-Etsu Chemical Co., Ltd.)
c2: silicone oligomer having an alkoxy group content of 20% by weight and a dynamic viscosity at 25° C. of 25 $mm^2$/s, and containing an amino group and a methoxy group in side chains (X-40-2651, manufactured by Shin-Etsu Chemical Co., Ltd.)
c3: 3-isocyanatepropyl triethoxysilane which is liquid at 25° C. (KBE-9007, manufactured by Shin-Etsu Chemical Co., Ltd.)
<Comparative Ingredients of (C) Ingredient>
c'1: silicone oligomer having an alkoxy group content of 17% by weight and a dynamic viscosity at 25° C. of 50 $mm^2$/s and containing a glycidyl group and a methoxy group (X-41-1056, manufactured by Shin-Etsu Chemical Co., Ltd.)
c'2: 3-acryloxy propyltrimethoxysilane (KBM-5103, manufactured by Shin-Etsu Chemical Co., Ltd.)
c'3: vinyltrimethoxysilane (KBM-1003, manufactured by Shin-Etsu Chemical Co., Ltd.)
c'4: N-2-(aminoethyl)-3-aminopropylmethyl dimethoxysilane (KBM-602, manufactured by Shin-Etsu Chemical Co., Ltd.)
c'5: 3-aminopropyl triethoxysilane (KBE-903, manufactured by Shin-Etsu Chemical Co., Ltd.)
<(D) Ingredient>
d1: dicyclopentanyl methacrylate (FA-513M, manufactured by Hitachi Chemical Co., Ltd.)

The test methods used in Examples and Comparative Examples in Tables 1 and 2 are as follows.

<Test for Adhesion to Electrolyte Membrane>

The photocurable resin composition was applied with a thickness of 50 μm to a polypropylene (PP) film, was stuck onto an electrolyte membrane made of a fluoropolymer having a sulfonic acid group (Nafion (registered trademark) manufactured by DuPont), and then was cured by irradiation from the PP film side with ultraviolet rays for 20 seconds at a total dose of 45 $kJ/m^2$. In this way, a test piece was prepared. Next, using a tension testing machine, the cured product of the photocurable resin composition together with the PP film was peeled off from the electrolyte membrane by being pulled in a 180° direction at a rate of peeling of 10 mm/minute. The adhesion interface was observed and evaluated based on the following criteria.

[Evaluation Criteria]
⊚ (Excellent): CF (cohesion failure) and membrane disruption
○ (Good): CF (cohesion failure) and membrane deformation
× (Poor): AF (adhesion failure)

TABLE 1

| Ingredient Name | Example 1 | Example 2 | Example 3 | Example 4 | Example 5 | Example 6 | Example 7 | Example 8 | Example 9 |
|---|---|---|---|---|---|---|---|---|---|
| a1 | 100 | 100 | 100 | 100 | 100 | 100 | 100 | 100 | 100 |
| b1 | 4 | 4 | 4 | | | | | | |
| b2 | | | | 4 | 4 | 4 | 4 | 4 | 4 |
| c1 | 4 | | | 4 | | | 8 | | |
| c2 | | 4 | | | 4 | | | 8 | |
| c3 | | | 4 | | | 4 | | | 8 |

TABLE 1-continued

| Ingredient Name | Example 1 | Example 2 | Example 3 | Example 4 | Example 5 | Example 6 | Example 7 | Example 8 | Example 9 |
|---|---|---|---|---|---|---|---|---|---|
| d1 | 50 | 50 | 50 | 50 | 50 | 50 | 50 | 50 | 50 |
| Adhesion to Electrolyte Membrane | ○ | ◎ | ◎ | ○ | ○ | ○ | ◎ | ◎ | ◎ |

TABLE 2

| Ingredient Name | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| a1 | 100 | 100 | 100 | 100 | 100 | 100 | 100 | 100 |
| b1 | 4 | 4 | 4 | 4 | 4 | 4 | | |
| b2 | | | | | | | 4 | 4 |
| c'1 | | 4 | | | | | 4 | 8 |
| c'2 | | | 4 | | | | | |
| c'3 | | | | 4 | | | | |
| c'4 | | | | | 4 | | | |
| c'5 | | | | | | 4 | | |
| d1 | 50 | 50 | 50 | 50 | 50 | 50 | 50 | 50 |
| Adhesion to Electrolyte Membrane | X | X | X | X | X | X | X | X |

Examples 1 to 9 in Table 1 demonstrate that the present invention enables the photocurable resin composition to be quickly cured by irradiation with active energy rays such as ultraviolet rays (for 20 seconds) and achieve excellent adhesion to an electrolyte membrane having properties difficult to bond.

Meanwhile, Comparative Example 1 is a composition not containing the (C) ingredient of the present invention, and was observed having poor adhesion to the electrolyte membrane (Table 2). Further, Comparative Examples 2 to 5 are compositions using ingredients other than the (C) ingredient of the present invention, which are the silicone oligomer containing the glycidyl group and the methoxy group, the 3-acryloxy propyltrimethoxysilane, the vinyltrimethoxysilane, and the N-2-(aminoethyl)-3-aminopropylmethyl dimethoxysilane, and resulted in poor adhesion to an electrolyte membrane (Table 2). Comparative Example 8 is a composition in which a content of the silicone oligomer containing the glycidyl group and the methoxy group is two times the content in Comparative Example 7, and resulted in poor adhesion to the electrolyte membranes (Table 2) as well.

Comparative Example 9

Comparative Example 9 was obtained in the same preparation method as in Example 1 except that urethane dimethacrylate having a polybutadiene backbone (TE-2000, manufactured by Nippon Soda Co., Ltd.) was used in place of the (A) ingredient in Example 1.

Comparative Example 10

Comparative Example 10 was obtained in the same preparation method as in Example 2 except that urethane diacrylate having a polyether backbone (UXF-4002, manufactured by Nippon Kayaku Co., Ltd.) was used in place of the (A) ingredient in Example 2.

<Moisture Permeability (Water Vapor Barrier Property)>

Each of the photocurable resin compositions in Examples 1 and 3 and Comparative Examples 9 and 10 was poured into a frame with 200 mm×200 mm×0.2 mm, and then was irradiated with ultraviolet rays for 20 seconds by using an ultraviolet irradiator at a total dose of 45 kJ/m$^2$. In this way, a cured product in a sheet form with a thickness of 1.0 mm was formed. Then, 5 g of (anhydrous) calcium chloride was placed in an aluminum cup having an opening with a diameter of 30 mm, and the cured product was set in the cup. After the "initial total weight" (g) was measured, the cup was left for 24 hours in a thermo-hygrostat kept at an atmosphere temperature of 40° C. and a relative humidity of 95% . Thereafter, the "total weight after leaving" (g) was measured, and the moisture permeability (g/m$^2$·24 h) was calculated and evaluated based on the following evaluation criteria. Table 3 presents the results. The detailed test method conforms to JIS Z 0208. For use as a photocurable sealing agent for a fuel cell, the moisture permeability is preferably less than 5 g/m$^2$·24 h.

[Evaluation Criteria]

○ (Good): The moisture permeability is less than 5 g/m$^2$·24 h.

Δ (Fair) : The moisture permeability is 5 g/m$^2$·24 h or more but less than 50 g/m$^2$·24 h.

× (Poor): The moisture permeability is 50 g/m$^2$·24 h or more.

<Hydrogen Gas Barrier Property Test>

Measurement was conducted using the photocurable resin compositions of Examples 1 and 3 and Comparative Examples 9 and 10 in accordance with JIS K 7126-1: 2006 (Plastics—Film and sheeting—Determination of gas-transmission rate—Part 1: Differential-pressure method). The type of the test was a pressure sensor method, and the gas transmission rate was measured on a sheet with a thickness of 1 mm under the conditions at 23° C. and with a test gas (hydrogen gas) on the high pressure side set to 100 kPa, and then was evaluated based on the following evaluation criteria. Table 3 presents the results. For use as a photocurable sealing agent for a fuel cell, the hydrogen gas barrier property is preferably less than 1×10$^{-15}$ mol·m/m$^2$·s·Pa.

[Evaluation Criteria]

○ (Good): less than 1×10$^{-15}$ mol·m/m$^2$·s·Pa

× (Poor): 1×10$^{-15}$ mol·m/m$^2$·s·Pa or more

TABLE 3

| | Example 1 | Example 3 | Comp. Ex. 9 | Comp. Ex. 10 |
|---|---|---|---|---|
| Moisture Permeability | ○ | ○ | Δ | X |
| Hydrogen Gas Barrier Property | ○ | ○ | X | X |

Examples 1 and 3 in Table 3 demonstrate that the present invention achieved favorable sealablity with low moisture permeability and excellent hydrogen barrier property. Meanwhile, Comparative Example 9 is a composition using the urethane dimethacrylate having the polybutadiene backbone in place of the (A) ingredient, and resulted in poor hydrogen gas barrier property. Then, Comparative Example 10 is a composition using the urethane diacrylate having the polyether backbone in place of the (A) ingredient, and resulted in poor moisture permeability and the poor hydrogen gas barrier property.

INDUSTRIAL APPLICABILITY

The photocurable resin composition of the present invention can be cured quickly by irradiation with active energy rays such as ultraviolet rays, and is excellent in the adhesion to an electrolyte membrane having properties difficult to bond. Thus, the photocurable resin composition of the present invention can be used for various kinds of sealing usages. The photocurable resin composition of the present invention is effective particularly as photocurable sealing agents for fuel cells, and therefore is industrially useful.

Other modes of the present invention may be as follows.

[21]

A photocurable resin composition containing the following (A) to (C) ingredients:

(A) ingredient: a polymer containing —[CH$_2$C(CH$_3$)$_2$]— unit and having one or more (meth)acryloyl groups;

(B) ingredient: a photo-radical polymerization initiator; and (C) ingredient: one or more compounds selected from silicone oligomers each having one or more alkoxy groups and one or more (meth)acryloyl groups, silicone oligomers each having one or more alkoxy groups and one or more amino groups and silane coupling agents (silane compounds) each having one or more isocyanate groups.

[22]

The photocurable resin composition according to the [21], further containing a (meth)acrylate monomer as (D) ingredient.

[23]

The photocurable resin composition according to the [22], wherein the (D) ingredient is a (meth)acrylate monomer containing an alkyl group or an alicyclic structure having 5 to 30 carbon atoms.

[24]

The photocurable resin composition according to any one of the [21] to [23], wherein a content of the (C) ingredient is 0.1 to 30 parts by mass relative to 100 parts by mass of the (A) ingredient.

[25]

The photocurable resin composition according to any one of the [21] to [24], wherein the (A) ingredient is a polyisobutylene polymer represented by the general formula (1):

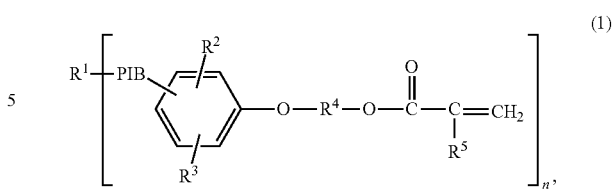

wherein $R^1$ represents a monovalent or polyvalent aromatic hydrocarbon group or a monovalent or polyvalent aliphatic hydrocarbon group, PIB represents a polyisobutylene backbone, $R^4$ represents a divalent hydrocarbon group having 2 to 6 carbon atoms and optionally containing an oxygen atom, $R^2$ and $R^3$ each represent a hydrogen atom or a monovalent hydrocarbon group having 1 to 20 carbon atoms, $R^5$ represents a hydrogen atom, a methyl group, an ethyl group, or a propyl group, and n is any integer of 1 to 6.

[26]

The photocurable resin composition according to any one of the [21] to [25], wherein the silicone oligomer having one or more alkoxy groups and one or more (meth)acryloyl groups, and the silicone oligomer having one or more alkoxy groups and one or more amino groups as the (C) ingredient have a dynamic viscosity at 25° C. of 45 mm$^2$/s or less.

[27]

The photocurable resin composition according to any one of the [21] to [26], which is used as a sealing agent for a fuel cell.

[28]

The photocurable resin composition according to any one of the [21] to [26], which is used as a sealing agent for a fuel cell, the sealing agent being to be applied to a periphery of any member selected from the group consisting of a separator, a frame, an electrolyte, a fuel electrode, an air electrode, and an MEA, which are members constituting the fuel cell.

[29]

The photocurable resin composition according to any one of the [21] to [26], which is used as a sealing agent between adjacent separators in a fuel cell, a sealing agent between a separator and a frame in the fuel cell, or a sealing agent between a frame and an electrolyte membrane or MEA in the fuel cell.

[30]

The photocurable resin composition according to any one of the [26] to [28], wherein the fuel cell is a solid polymer fuel cell.

[31]

A fuel cell, wherein the photocurable resin composition according to any one of the [21] to [26] is used for a seal between adjacent separators in the fuel, a seal between a separator and a frame in the fuel, or a seal between a frame and an electrolyte membrane or MEA in the fuel.

[32]

The fuel cell according to the [30], wherein the fuel cell is a solid polymer fuel cell.

[33]

A sealing method, comprising:

applying the photocurable resin composition according to any one of the [21] to [26] to a flange of a seal target component; and irradiating the flange and another flange, which are stuck on each other, with active energy rays from a light-transmissive flange side, thereby curing the photocurable resin composition to seal the flanges.

[34]

A sealing method comprising:

forming a gasket by applying the photocurable resin composition according to any one of the [21] to [26] to a flange of a seal target component, and curing the photocurable resin composition by irradiation with active energy rays; and thereafter sticking the flange to another flange and compression sealing the flanges.

[35]

A sealing method comprising:

placing a mold in pressure contact with a flange of a seal target component in advance;

forming a gasket by injecting the photocurable resin composition according to any one of the [21] to [26] into a cavity formed between the mold and the flange, and photo-curing the photocurable resin composition by irradiation with the active energy rays; and thereafter sticking the flange to another flange and sealing the flanges.

REFERENCE SIGNS LIST 1 cell in solid polymer fuel cell
2 separator
3a air electrode (cathode)
3b fuel electrode (anode)
4 polymer electrolyte membrane
5 electrolyte membrane electrode conjugant (MEA)
6 frame
7 adhesive or sealing agent
8a oxidation gas flow path
8b fuel gas flow path
9 cooling water flow path
10 cell stack
11 solid polymer fuel cell

The invention claimed is:

1. A photocurable resin composition comprising the following (A) to (C) ingredients:

(A) ingredient: a polymer having a polyisobutylene backbone and represented by a general formula (1):

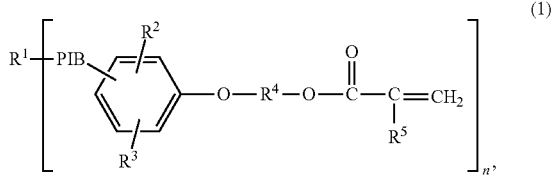

wherein $R^1$ represents a monovalent or polyvalent aromatic hydrocarbon group or a monovalent or polyvalent aliphatic hydrocarbon group, PIB represents a polyisobutylene backbone containing a —[$CH_2C(CH_3)_2$]— unit, $R^4$ represents a divalent hydrocarbon group having 2 to 6 carbon atoms and optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, an ethyl group, or a propyl group, and n is any integer of 1 to 6;

(B) ingredient: a photo-radical polymerization initiator; and (C) ingredient: one or more compounds selected from the group consisting of silicone oligomers each having one or more alkoxy groups and one or more (meth)acryloyl groups, silicone oligomers each having one or more alkoxy groups and one or more amino groups, and silane compounds each having one or more isocyanate groups.

2. The photocurable resin composition according to claim 1, further comprising a (meth)acrylate monomer as (D) ingredient.

3. The photocurable resin composition according to claim 2, wherein the (D) ingredient is a (meth)acrylate monomer containing an alkyl group having 5 to 30 carbon atoms or an alicyclic group having 5 to 30 carbon atoms.

4. The photocurable resin composition according to claim 1, wherein a content of the (C) ingredient is 0.1 to 30 parts by mass relative to 100 parts by mass of the (A) ingredient.

5. The photocurable resin composition according to claim 1, wherein
the (C) ingredient is at least one of the silicone oligomers each having one or more alkoxy groups and one or more (meth)acryloyl groups and the silicone oligomers each having one or more alkoxy groups and one or more amino groups, and
a dynamic viscosity at 25° C. of the least one silicone oligomer is less than 45 mm²/s.

6. A photocurable sealing agent for a fuel cell, the sealing agent comprising the photocurable resin composition according to claim 1.

7. The sealing agent according to claim 6, wherein the photocurable sealing agent for a fuel cell is a photocurable sealing agent for a fuel cell to be applied to a periphery of any member selected from the group consisting of a separator, a frame, an electrolyte, a fuel electrode, an air electrode, and an electrolyte membrane electrode conjugant which are members constituting the fuel cell.

8. The sealing agent according to claim 6, wherein the photocurable sealing agent for a fuel cell is a sealing agent between adjacent separators in a fuel cell, a sealing agent between a separator and a frame in the fuel cell, or a sealing agent between a frame and an electrolyte membrane or an electrolyte membrane electrode conjugant in the fuel cell.

9. The sealing agent according to claim 6, wherein the fuel cell is a solid polymer fuel cell.

10. A cured product obtained by photocuring the photocurable resin composition according to claim 1.

11. A fuel cell comprising any seal selected from the group consisting of a seal between adjacent separators in the fuel cell, a seal between a separator and a frame in the fuel cell, and a seal between a frame and an electrolyte membrane or an electrolyte membrane electrode conjugant in the fuel cell, wherein
any one of the seals contains the cured product according to claim 10.

12. The fuel cell according to claim 11, wherein the fuel cell is a solid polymer fuel cell.

13. A method for sealing at least part of between at least two flanges of seal target components including the at least two flanges, at least one of which is a light-transmissive flange that allows active energy rays to pass therethrough, the method comprising the steps of:

applying the photocurable resin composition according to claim 1 to a surface of at least one of the flanges;

sticking the one flange with the photocurable resin composition applied thereto onto the other flange with the photocurable resin composition interposed in between; and sealing the at least part of between the at least two flanges by curing the photocurable resin composition by irradiation with active energy rays through the light-transmissive flange.

14. A method for sealing at least part of between at least two flanges of seal target components including the at least two flanges, the method comprising the steps of:

applying the photocurable resin composition according to claim 1 to at least one of the flanges;

irradiating the applied photocurable resin composition with active energy rays to cure the photocurable resin composition, thereby forming a gasket composed of a cured product of the photocurable resin composition; and placing the other flange on the gasket, and sealing the at least part of between the at least two flanges in such a way that the other flange and the one flange with the photocurable resin composition applied thereto are pressure bonded together with the gasket interposed in between.

15. A method for sealing at least part of between at least two flanges of seal target components including the at least two flanges, the method comprising the steps of:

placing a gasket formation mold on at least one of the flanges;

injecting the photocurable resin composition according to claim 1 into at least part of a cavity formed between the gasket formation mold and the flange on which the mold is placed;

irradiating the photocurable resin composition with the active energy rays to cure the photocurable resin composition, thereby forming a gasket composed of a cured product of the photocurable resin composition;

detaching the mold from the one flange; and placing the other flange on the gasket and sealing the at least part of between the at least two flanges by pressure bonding the one flange and the other flange together with the gasket interposed in between.

* * * * *